United States Patent
Jones et al.

(10) Patent No.: US 12,440,999 B2
(45) Date of Patent: Oct. 14, 2025

(54) BATTERY PACK POWERED ROBOTIC DEVICES

(71) Applicant: MILWAUKEE ELECTRIC TOOL CORPORATION, Brookfield, WI (US)

(72) Inventors: Chad E. Jones, Jackson, WI (US); Tauhira Ali, Milwaukee, WI (US); Andrew M. Lambert, Delafield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 551 days.

(21) Appl. No.: 17/550,735

(22) Filed: Dec. 14, 2021

(65) Prior Publication Data
US 2022/0190611 A1    Jun. 16, 2022

Related U.S. Application Data (60) Provisional application No. 63/125,496, filed on Dec. 15, 2020.

(51) Int. Cl.
*B25J 13/00* (2006.01)
*B25J 5/00* (2006.01)
(Continued)

(52) U.S. Cl.
CPC ............. *B25J 13/006* (2013.01); *B25J 5/007* (2013.01); *B60L 53/80* (2019.02);
(Continued)

(58) Field of Classification Search
CPC ...... B25J 13/006; B25J 5/007; H02J 7/00032; H02J 7/00047; H02J 7/342; H02J 7/0045; H04B 1/38; B60L 53/80
(Continued)

(56) References Cited

U.S. PATENT DOCUMENTS

| | | | |
|---|---|---|---|
| 8,666,546 B2* | 3/2014 | Sarh | B25J 5/007 |
| | | | 700/248 |
| 8,736,228 B1* | 5/2014 | Freed | H02J 7/0044 |
| | | | 320/114 |

(Continued)

FOREIGN PATENT DOCUMENTS

| | | |
|---|---|---|
| EP | 3072641 A1 | 9/2016 |
| EP | 3482884 A1 | 5/2019 |

(Continued)

OTHER PUBLICATIONS

International Search Report and Written Opinion for Application No. PCT/US2021/063335 dated Apr. 1, 2022 (10 pages).

(Continued)

*Primary Examiner* — Edward Tso
*Assistant Examiner* — Aaron Piggush
(74) *Attorney, Agent, or Firm* — Michael Best & Friedrich LLP (57) ABSTRACT

A battery pack powered robotic device that includes a housing, a plurality of wheels connected to the housing, a battery pack receiving interface on the housing and configured to receive at least one battery pack for powering the robotic device, a wireless communications module, and a controller. The wireless communications module is configured to receive a control signal from an external device. The wireless communications module is detachably connected to the housing of the robotic device. The controller is configured to receive the control signal from the wireless communications module, determine whether to power on or power off the robotic device based on the control signal, and power on the robotic device in response to the control signal.

16 Claims, 7 Drawing Sheets

(51) Int. Cl.
*B60L 53/80* (2019.01)
*H02J 7/00* (2006.01)
*H02J 7/34* (2006.01)
*H04B 1/38* (2015.01)

(52) U.S. Cl.
CPC ...... *H02J 7/00032* (2020.01); *H02J 7/00047* (2020.01); *H02J 7/0045* (2013.01); *H02J 7/342* (2020.01); *H04B 1/38* (2013.01)

(58) Field of Classification Search
USPC ................................ 320/104, 107, 109, 110
See application file for complete search history.

(56) References Cited

U.S. PATENT DOCUMENTS

| | | | | |
|---|---|---|---|---|
| 8,977,393 | B1* | 3/2015 | Kohler | H02J 7/02 320/107 |
| 11,086,314 | B1* | 8/2021 | Ebrahimi Afrouzi | G05D 1/0088 |
| 2017/0327091 | A1* | 11/2017 | Capizzo | B60L 53/36 |
| 2018/0104829 | A1* | 4/2018 | Altman | B25J 5/007 |
| 2020/0242544 | A1* | 7/2020 | Galluzzo | B25J 5/007 |
| 2020/0316786 | A1* | 10/2020 | Galluzzo | B25J 13/006 |
| 2021/0016433 | A1* | 1/2021 | Bidram | B25J 13/006 |
| 2021/0032034 | A1* | 2/2021 | Kalouche | B25J 13/006 |

FOREIGN PATENT DOCUMENTS

| | | |
|---|---|---|
| WO | 2007084965 A2 | 7/2007 |
| WO | 2019173918 A1 | 9/2019 |
| WO | 2020225486 A1 | 11/2020 |
| WO | 2021102285 A1 | 5/2021 |

OTHER PUBLICATIONS

Extended European Search Report for Application No. 21907642.9 dated Oct. 1, 2024 (9 pages).

* cited by examiner

BATTERY PACK POWERED ROBOTIC DEVICES

RELATED APPLICATIONS

This application claims the benefit of U.S. Provisional Patent Application No. 63/125,496, filed Dec. 15, 2020, the entire content of which is hereby incorporated by reference.

BACKGROUND

Embodiments described herein provide battery pack powered devices.

SUMMARY

Embodiments described herein provide material moving machines operable to be powered by one or more power tool battery packs.

Battery pack powered robotic devices described herein include a housing, a plurality of wheels connected to the housing, a motor configured to drive the plurality of wheels, a battery pack receiving interface on the housing and configured to receive at least one battery pack for powering the robotic device, a wireless communications module configured to receive a control signal from an external device, a controllable arm, and a controller. The controllable arm includes one or more joints and a clamping device. The one or more joints are configured to articulate the controllable arm. The clamping device is configured to clamp an object. The controller is configured to receive the control signal from the external device, determine whether to articulate the controllable arm or drive the motor of the plurality of wheels based on the control signal from the external device, and articulate, in response to the control signal, the controllable arm to clamp the object with the clamping device.

Battery pack powered robotic devices described herein include a housing, a plurality of wheels connected to the housing, a battery pack receiving interface on the housing and configured to receive at least one battery pack for powering the robotic device, a wireless communications module, and a controller. The wireless communications module is configured to receive a control signal from an external device. The wireless communications module is detachably connected to the housing of the robotic device. The controller is configured to receive the control signal from the wireless communications module, determine whether to power on or power off the robotic device based on the control signal, and power on the robotic device in response to the control signal.

Battery pack powered robotic devices described herein include a housing, a plurality of wheels connected to the housing, a motor configured to drive the plurality of wheels, a battery pack receiving interface on the housing and configured to receive at least one battery pack for powering the robotic device, a wireless communications module, a controllable arm, and a controller. The wireless communications module is configured to receive a control signal from an external device. The wireless communication module and the external device are configured to communicate wirelessly while within a communication range. The controllable arm includes one or more joints and a clamping device. The one or more joints are configured to articulate the controllable arm. The clamping device is configured to clamp an object. The controller is configured to receive the control signal from the wireless communications module, determine whether to articulate the controllable arm based on the control signal, and articulate the controllable arm to clamp the object in response to the control signal.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
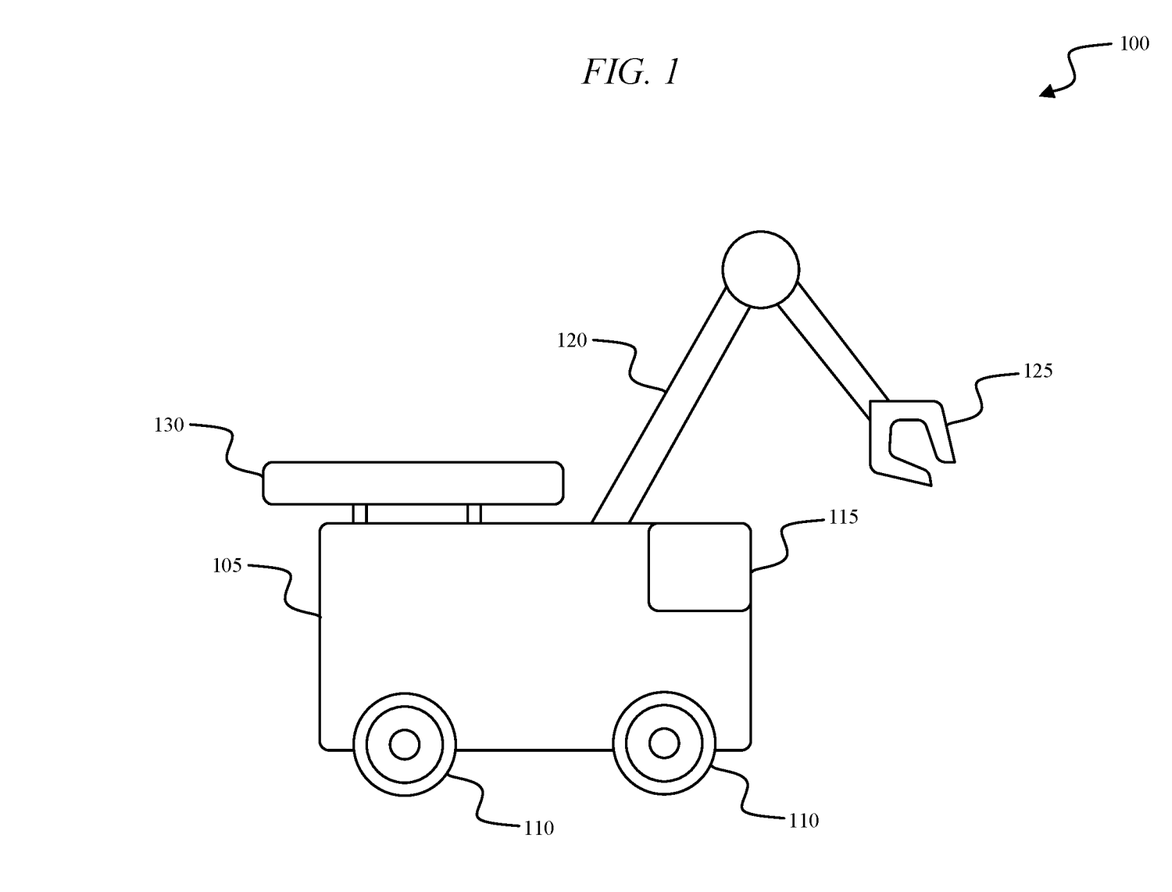
FIG. 1 illustrates a battery pack powered robotic device, according to some embodiments described herein.

FIG. 1 illustrates a battery pack powered robotic device 100. The robotic device 100 includes a main housing or body 105, a plurality of wheels 110, a battery pack receiving interface 115, a controllable arm 120, a gripping or clamping device 125 (e.g., for holding objects, controlling power tools, etc.), and a storage/transport bed 130 or container for transporting materials. The controllable arm 120 can be an articulating arm that includes multiple joints for articulating the controllable arm 120. In some embodiments, the arm 120 is a hydraulic arm 120. In other embodiments, the arm 120 is implemented using servo-electric motors for precision control. Each joint can be configured to full 360-degree rotation range to maximize maneuverability. In some embodiments, the arm 120 is configured to be removably attached to the housing 105 such that it can be detached from the housing 105 and re-attached to a different housing structure (e.g., a stationary structure).

The battery pack receiving interface 115 is configured to receive one or more battery packs for powering the robotic device 100. In some embodiments, the robotic device 100 includes internal battery cells that can be used to charge one or more battery packs in the battery pack receiving interface 115. In such embodiments, the internal battery cells can be charged from an AC power input (e.g., mains power) or from one or more battery packs in the battery pack receiving interface 115. The controllable arm 120 and clamping device 125 are configured to perform or assist the lifting (e.g., unloading crane picks, assisting with alignment, etc.), transportation, or inspection of heavy objects. In some embodiments, the storage/transport bed 130 is used to transporting materials around a jobsite. In some embodiments, the robotic arm 120 is used to help install pre-fabricated materials (e.g., wall frames, etc.) or perform other construction tasks commonly encountered on a jobsite.

The robotic device 100 can also be configured to use specialized tools that have increased weight or require increased precision beyond what a typical human would be able to lift or achieve. In some embodiments, the robotic device 100 is miniaturized or is only a robotic arm and clamp or provide support or to relieve a portion of an object's weight.

Figure 2:
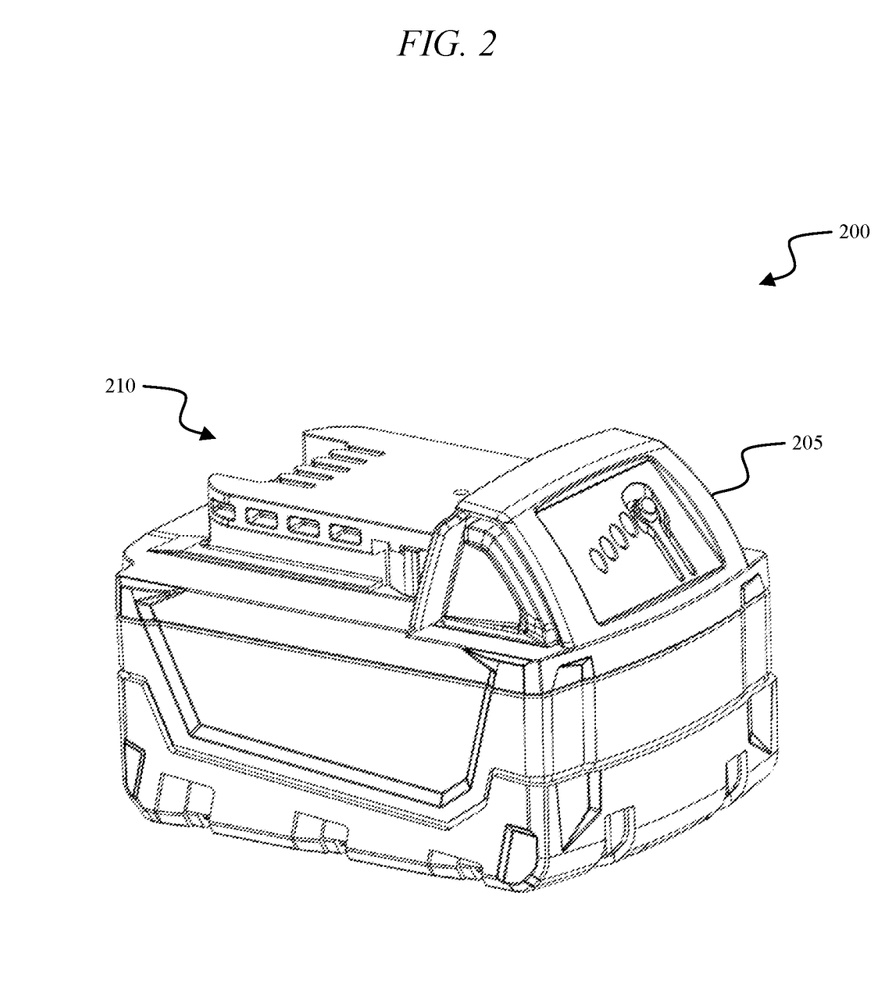
FIG. 2 illustrates a battery pack for powering the robotic device of FIG. 1, according to some embodiments described herein.

FIG. 2 illustrates a battery pack 200 for powering the robotic device 100. The battery pack 200 includes a housing 205 and an interface portion 210. In some embodiments, the battery pack 200 has a nominal voltage of 18V and an ampere-hour ("Ah") capacity of between 3.0 Ah and 15.0 Ah. In some embodiments, the battery pack 200 has a lithium-based chemistry.

Figure 3:
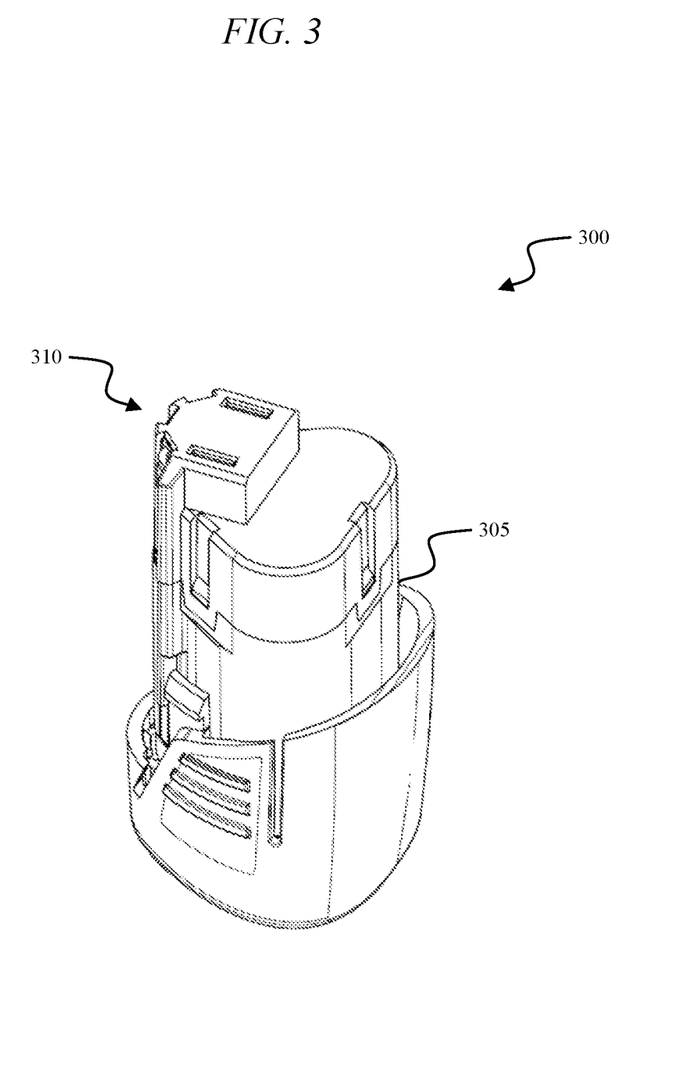
FIG. 3 illustrates a battery pack for powering the robotic device of FIG. 1, according to some embodiments described herein.

FIG. 3 illustrates a battery pack 300 for powering the robotic device 100. The battery pack 300 includes a housing 305 and an interface portion 310. In some embodiments, the battery pack 300 has a nominal voltage of 12V and an ampere-hour ("Ah") capacity of between 1.5 Ah and 15.0 Ah. In some embodiments, the battery pack 300 has a lithium-based chemistry.

Figure 4:
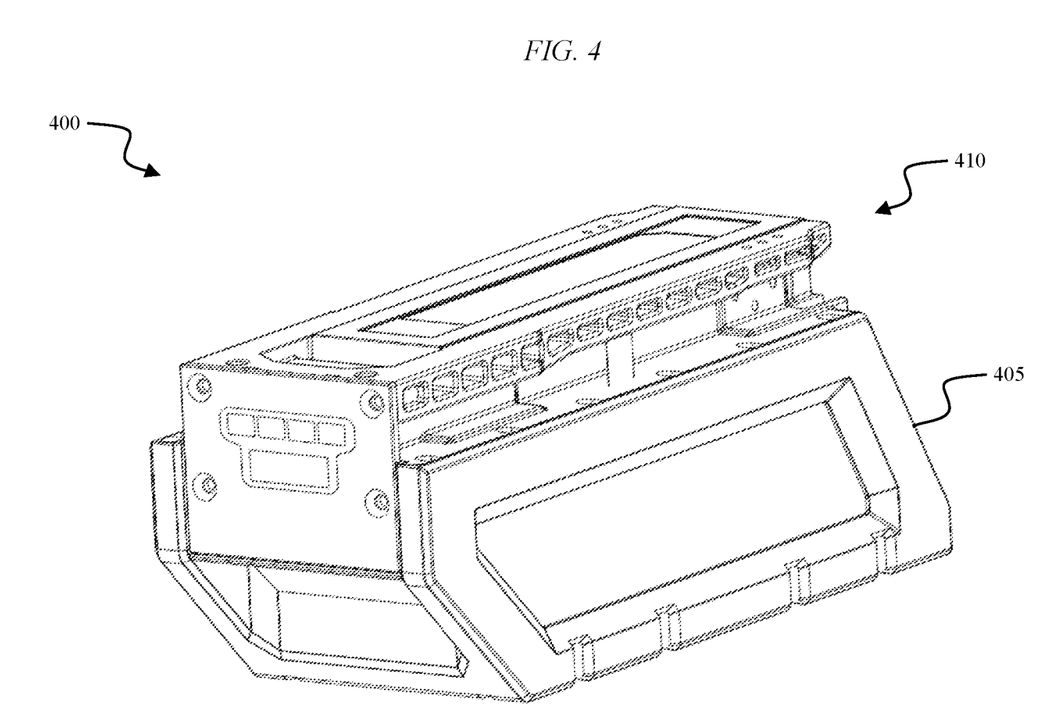
FIG. 4 illustrates a battery pack for powering the robotic device of FIG. 1, according to some embodiments described herein.

FIG. 4 illustrates a battery pack 400 for powering the robotic device 100. The battery pack 400 includes a housing 405 and an interface portion 410. In some embodiments, the battery pack 400 has a nominal voltage of between 70V and 120V and an ampere-hour ("Ah") capacity of between 3.0 Ah and 15.0 Ah. In some embodiments, the battery pack 400 has a lithium-based chemistry.

Figure 5:
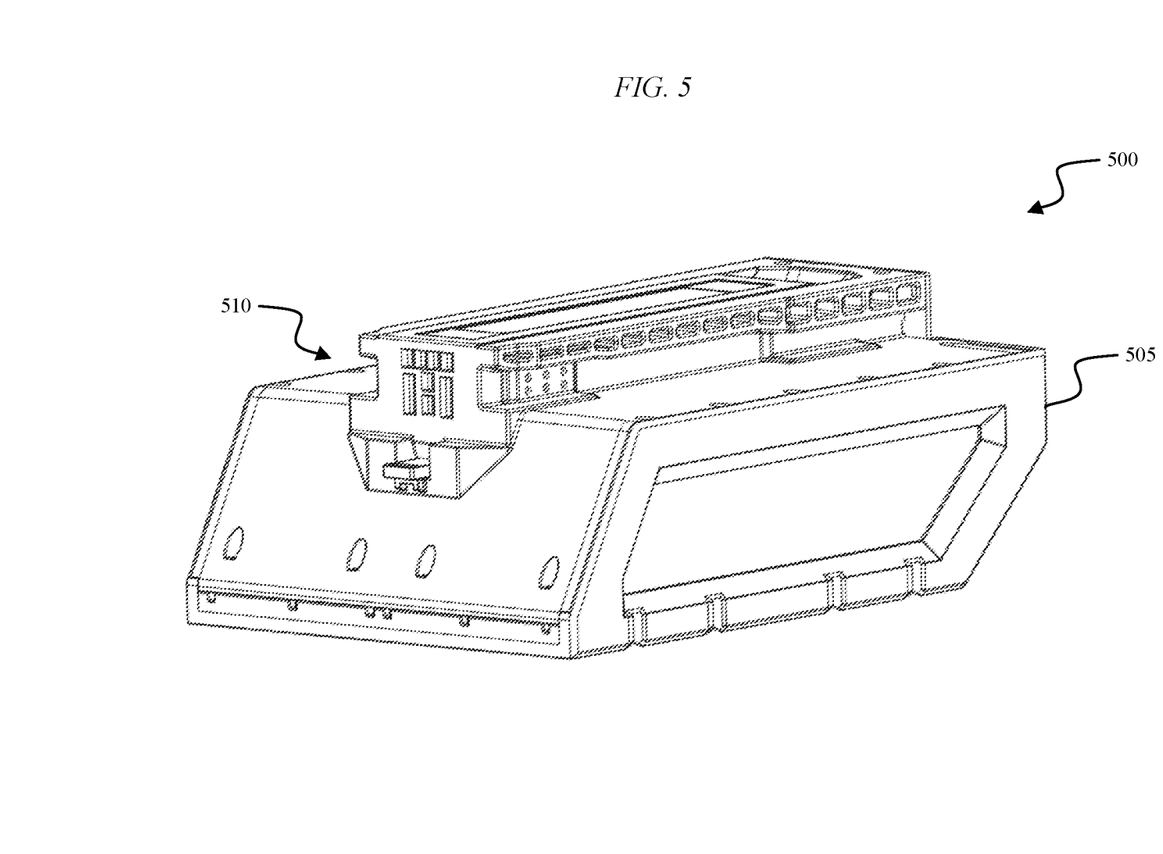
FIG. 5 illustrates a battery pack for powering the robotic device of FIG. 1, according to some embodiments described herein.

FIG. 5 illustrates a battery pack 500 for powering the robotic device 100. The battery pack 500 includes a housing 505 and an interface portion 510. In some embodiments, the battery pack 500 has a nominal voltage of between 70V and 120V and an ampere-hour ("Ah") capacity of between 3.0 Ah and 30.0 Ah. In some embodiments, the battery pack 500 has a lithium-based chemistry.

In some embodiments, one or more of the battery packs 200, 300, 400, and 500 can be used to power the robotic device when attached to a corresponding respective interface of the robotic device 100. In some embodiments, a plurality of the same battery packs 200, 300, 400, 500 can be used to power the robotic device 100.

Figure 6:
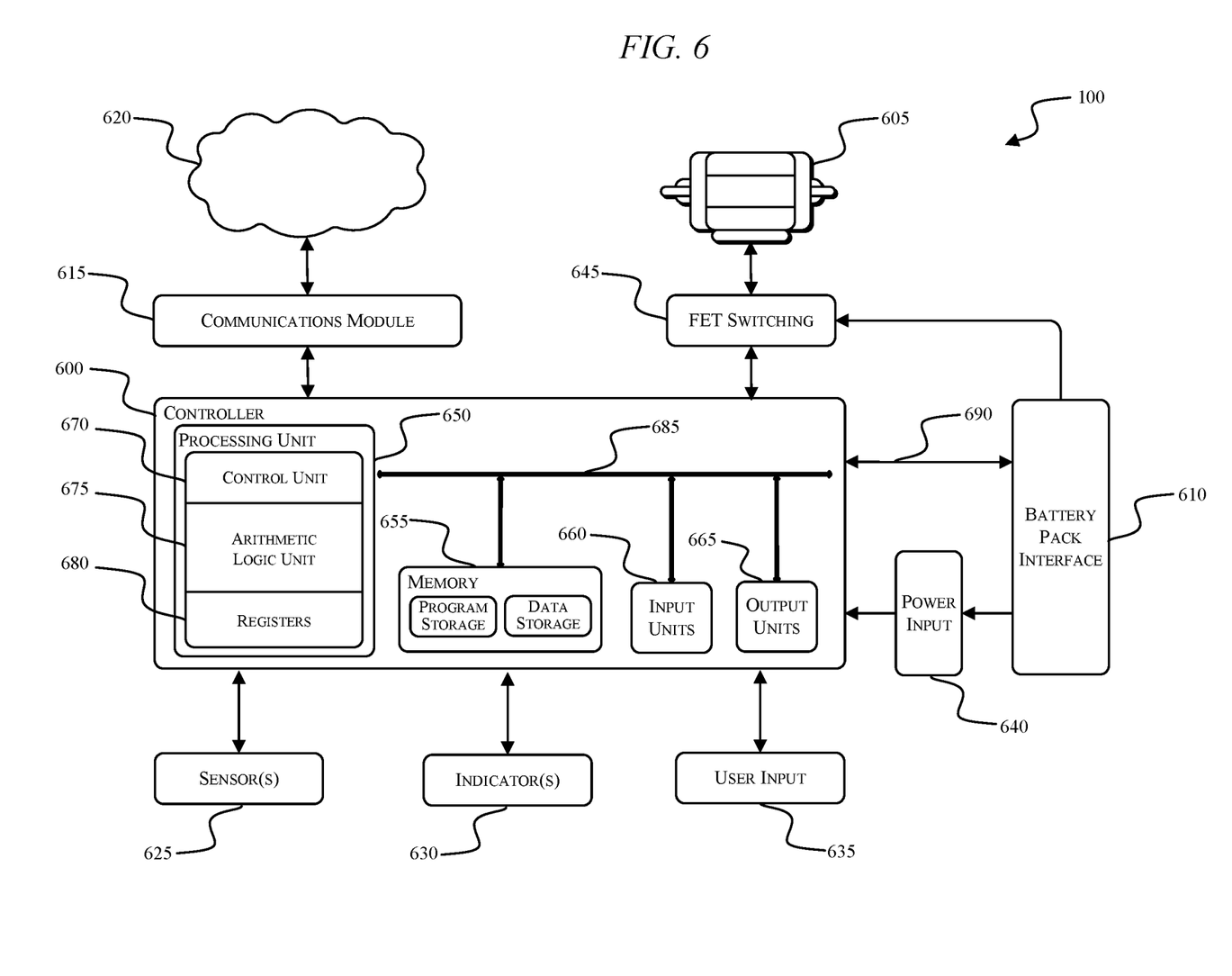
FIG. 6 illustrates a control system for the robotic device of FIG. 1, according to some embodiments described herein.

FIG. 6 illustrates a control system for the robotic device 100. The control system includes a controller 600. The controller 600 is electrically and/or communicatively connected to a variety of modules or components of the robotic device 100. For example, the illustrated controller 600 is electrically connected to one or more motors 605, a battery pack interface 610, a communications module 615 (connected to a network 620), one or more sensors or sensing circuits 625 (e.g., accelerometers, voltage sensors, temperature sensors, proximity sensors, cameras, etc.), one or more indicators 630, a user input module 635, a power input module 640, and a FET switching module 645 (e.g., including a plurality of switching FETs). The controller 600 includes combinations of hardware and software that are operable to, among other things, control the operation of the robotic device 100, monitor the operation of the robotic device 100, activate the one or more indicators 630 (e.g., an LED), etc. In some embodiments, the sensors 625 are used for construction inspection (e.g., remote inspection of a jobsite).

The controller 600 includes a plurality of electrical and electronic components that provide power, operational control, and protection to the components and modules within the controller 600 and/or the robotic device 100. For example, the controller 600 includes, among other things, a processing unit 650 (e.g., a microprocessor, a microcontroller, an electronic processor, an electronic controller, or another suitable programmable device), a memory 655, input units 660, and output units 665. The processing unit 650 includes, among other things, a control unit 670, an ALU 675, and a plurality of registers 680 (shown as a group of registers in FIG. 6), and is implemented using a known computer architecture (e.g., a modified Harvard architecture, a von Neumann architecture, etc.). The processing unit 650, the memory 655, the input units 660, and the output units 665, as well as the various modules or circuits connected to the controller 600 are connected by one or more control and/or data buses (e.g., common bus 685). The control and/or data buses are shown generally in FIG. 6 for illustrative purposes.

The memory 655 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 650 is connected to the memory 655 and executes software instructions that are capable of being stored in a RAM of the memory 655 (e.g., during execution), a ROM of the memory 655 (e.g., on a generally permanent basis), or another non-transitory computer readable medium such as another memory or a disc. Software included in the implementation of the robotic device 100 can be stored in the memory 655 of the controller 600. The software includes, for example, firmware, one or more applications, program data, filters, rules, one or more program modules, and other executable instructions. The controller 600 is configured to retrieve from the memory 655 and execute, among other things, instructions related to the control processes and methods described herein. In other constructions, the controller 600 includes additional, fewer, or different components.

The battery pack interface 610 includes a combination of mechanical components (e.g., rails, grooves, latches, etc.) and electrical components (e.g., one or more terminals) configured to and operable for interfacing (e.g., mechanically, electrically, and communicatively connecting) the robotic device 100 with a battery pack (e.g., the battery pack 200, 300, 400, 500). For example, power provided by the battery pack 200, 300, 400, 500 to the robotic device 100 is provided through the battery pack interface 610 to the power input module 640. The power input module 640 includes combinations of active and passive components to regulate or control the power received from the battery pack 200, 300, 400, 500 prior to power being provided to the controller 600. The battery pack interface 610 also supplies power to the FET switching module 645 to be switched by the switching FETs to selectively provide power to the motor 605 for moving the robotic device 100, controlling the arm 120, etc. In some embodiments, the robotic device 100 is programmed or configured to follow a predetermined transport path across a jobsite (e.g., based on GPS location data). For example, the robotic device 100 can store a set of instructions related to the predetermined transport path in the memory 655. The set of instructions can be received from an external device as one or more control signals to control the robotic device to follow the predetermined transport path. The battery pack interface 610 also includes, for example, a communication line 690 for providing a communication line or link between the controller 600 and the battery pack 200, 300, 400, 500.

The indicators 630 include, for example, one or more light-emitting diodes ("LEDs"). The indicators 630 can be configured to display conditions of, or information associated with, the robotic device 100. For example, the indicators 630 are configured to indicate measured electrical characteristics of the robotic device 100, the status of the robotic device 100, etc. The user input module 635 is operably coupled to the controller 600 to, for example, turn the robotic device 100 ON or OFF, select a task for the robotic device 100 to complete, select a destination for the robotic device 100, etc. In some embodiments, the user input module 635 includes a combination of digital and analog input or output devices required to achieve a desired level of operation for the robotic device 100, such as one or more knobs, one or more dials, one or more switches, one or more buttons, etc.

In the illustrated embodiment, the communication module or communications controller 615 is a Bluetooth® controller. The Bluetooth® controller is configured to communicate with an external device also employing the Bluetooth® protocol. Therefore, in the illustrated embodiment, an external device and the robotic device 100 can exchange data when they are within a communication range (i.e., in proximity) to each other. In other embodiments, the communications module 615 communicates using a different protocol (e.g., Wi-Fi, ZigBee, a proprietary protocol, etc.) over different types of wireless networks. For example, the communications module 615 may be configured to communicate via Wi-Fi through a wide area network such as the Internet, a local area network, or through a piconet (e.g., using infrared or NFC communications).

In some embodiments, the communications module 615 includes a global positioning system ("GPS") for tracking the location of the robotic device 100 and/or materials being lifted or transported. In some embodiments, materials being lifted or transported are tracked by the robotic device based on scanning a code (e.g., a QR code, etc.), RFID tag scanning, or other wireless communication with the materials being lifted or transported. The communications module 615 is configured to broadcast or receive beacon signals for connecting with external devices (e.g., smart phones, power tools, battery packs, etc.). In some embodiments, the communications module 615 is a removable wireless communications module that is detachably connectable to the robotic device 100, such as the communications module disclosed in PCT Patent Application No. PCT/US2020/061544, filed Nov. 20, 2020 and entitled "INSERTABLE WIRELESS COMMUNICATION DEVICE FOR A POWER TOOL," the entire content of which is hereby incorporated by reference.

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3 GSM network, a 4 GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 7:
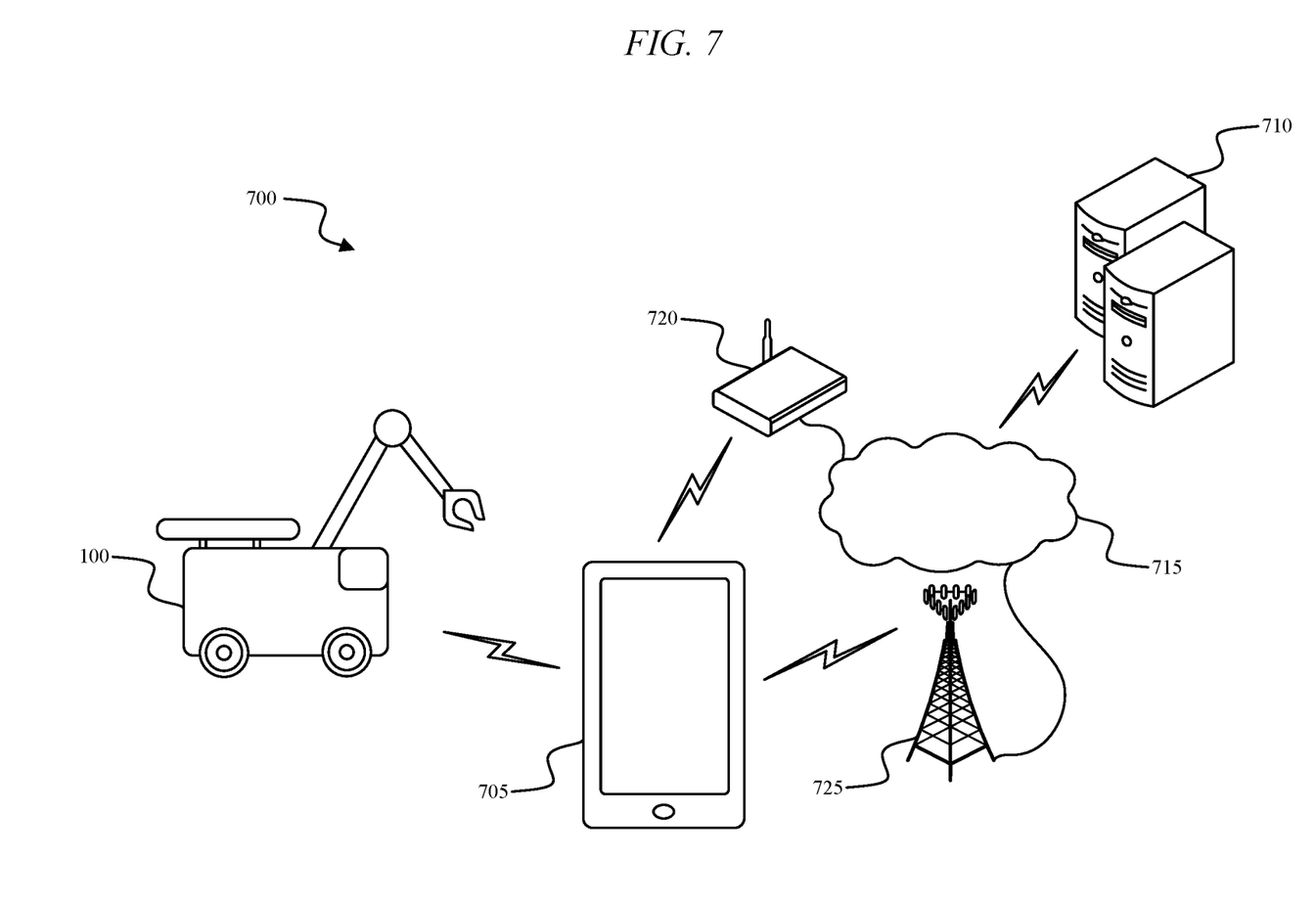
FIG. 7 illustrates a communication system for the robotic device of FIG. 1, according to some embodiments described herein.

FIG. 7 illustrates a communication system 700. The communication system 700 includes at least one robotic device 100 and an external device 705. Each robotic device 100 and the external device 705 can communicate wirelessly while they are within a communication range of each other. Each robotic device 100 is configured to communicate, for example, status, operation statistics (e.g., unloading time, installation time, etc.), identification, location, sensor data, usage information, maintenance data, project or task complete, and the like.

Using the external device 705, a user can access the robotic device 100. The external device 705 can also transmit data to the robotic device 100 for configuration, firmware updates, or to send commands. The external device 705 also allows a user to set operational parameters, safety parameters, select operational modes, and the like for the robotic device 100.

The external device 705 is, for example, a smart phone, a laptop computer, a tablet computer, a personal digital assistant (PDA), or another electronic device capable of communicating wirelessly with the robotic device 100 and providing a user interface. The external device 705 provides the user interface and allows a user to access and interact with the robotic device 100. The external device 705 can receive user inputs to determine operational parameters, enable or disable features, and the like. The user interface of the external device 705 provides an easy-to-use interface for the user to control and customize operation of the robotic device 100. The external device 705 provides a user interface such that the user can interact with the controller 600 of the robotic device 100.

In addition, as shown in FIG. 7, the external device 705 can share the operational data obtained from the robotic device 100 with a remote server 710 connected through a network 715. The remote server 710 may be used to store the operational data obtained from the external device 705, provide additional functionality and services to the user, or a combination thereof. In some embodiments, storing the information on the remote server 710 allows a user to access the information from a plurality of different locations. In some embodiments, the remote server 710 collects information from various users regarding their robotic devices and provides statistics or statistical measures to the user based on information obtained from the different robotic devices. The network 715 may include various networking elements (routers 720, hubs, switches, cellular towers 725, wired connections, wireless connections, etc.) for connecting to, for example, the Internet, a cellular data network, a local network, or a combination thereof as previously described. In some embodiments, the robotic device 100 is configured to communicate directly with the server 710 through an additional wireless interface or with the same wireless interface that the robotic device 100 uses to communicate with the external device 705.

Thus, embodiments described herein provide, among other things, a battery pack powered robotic device. Various features and advantages are set forth in the following claims.

What is claimed is:

1. A battery pack powered robotic device comprising:
   a housing;
   a plurality of wheels connected to the housing;
   a motor configured to drive the plurality of wheels;
   a battery pack receiving interface on the housing and configured to receive at least one battery pack for powering the robotic device, wherein the battery pack receiving interface is configured to interface the robotic device with a plurality of different types of battery packs, wherein the battery pack receiving interface is configured to interface the robotic device with at least one of a first battery pack of the plurality of different types of battery packs having a nominal voltage of 18 volts (V) and a battery capacity of between 3 ampere-hours (Ah) and 15 Ah, a second battery pack of the plurality of different types of battery packs having a nominal voltage of 12 V and a battery capacity of between 1.5 Ah and 15 Ah, a third battery pack of the plurality of different types of battery packs having a nominal voltage of between 70 V and 120 V and a battery capacity of between 3 Ah and 15 Ah, and a fourth battery pack of the plurality of different types of battery packs having a nominal voltage of between 70 V and 120 V and a battery capacity of between 3 Ah and 30 Ah;
   a wireless communications module configured to receive a control signal from an external device;
   a controllable arm including one or more joints and a clamping device, the one or more joints configured to articulate the controllable arm, the clamping device configured to clamp an object; and
   a controller configured to:
      receive the control signal from the external device,
      determine whether to articulate the controllable arm or drive the motor of the plurality of wheels based on the control signal from the external device, and
      articulate, in response to the control signal, the controllable arm to clamp the object with the clamping device.

2. The robotic device of claim 1, wherein the controllable arm is a hydraulic arm.

3. The robotic device of claim 1, wherein the controllable arm is controlled using at least one servo-electric motor.

4. The robotic device of claim 1, wherein each joint of the one or more joints is configured to rotate in a 360-degree rotation range.

5. The robotic device of claim 1, wherein the controllable arm is configured to be removably attached to the housing.

6. The robotic device of claim 1, comprising a storage bed to transport objects moved by the controllable arm.

7. The robotic device of claim 1, further comprising at least one internal battery cell configured to charge the at least one battery pack for powering the robotic device.

8. A battery pack powered robotic device comprising:
   a housing;
   a plurality of wheels connected to the housing;
   a battery pack receiving interface on the housing and configured to receive at least one battery pack for powering the robotic device, wherein the battery pack receiving interface is configured to interface the robotic device with a plurality of different types of battery packs, wherein the battery pack receiving interface is configured to interface the robotic device with at least one of a first battery pack having a nominal voltage of 18 volts (V) and a battery capacity of between 3 ampere-hours (Ah) and 15 Ah, a second battery pack having a nominal voltage of 12 V and a battery capacity of between 1.5 Ah and 15 Ah, a third battery pack having a nominal voltage of between 70 V and 120 V and a battery capacity of between 3 Ah and 15 Ah, and a fourth battery pack having a nominal voltage of between 70 V and 120 V and a battery capacity of between 3 Ah and 30 Ah;
   a wireless communications module configured to receive a control signal from an external device, the wireless communications module is removable from and detachably connected to the housing of the robotic device; and
   a controller configured to:

receive the control signal from the wireless communications module, determine whether to power on or power off the robotic device based on the control signal, power on the robotic device in response to the control signal, and control an articulation of each of one or more joints of a controllable arm to clamp an object.

9. The robotic device of claim 8, further comprising a sensor selected from the group consisting of a camera and a proximity sensor.

10. The robotic device of claim 8, further comprising a memory configured to store a predetermined transport path for the robotic device, wherein the control signal the includes a set of instructions related to the predetermined transport path for the robotic device, and wherein the controller is further configured to control, based on the set of instructions, the plurality of wheels for the robotic device to follow the predetermined transport path.

11. The robotic device of claim 8, further comprising at least one internal battery cell configured to charge the at least one battery pack for powering the robotic device.

12. A robotic device comprising:

a housing;

a plurality of wheels connected to the housing;

a motor configured to drive the plurality of wheels;

a battery pack receiving interface on the housing and configured to receive at least one battery pack for powering the robotic device, wherein the battery pack receiving interface is configured to interface the robotic device with a plurality of different types of battery packs, wherein the battery pack receiving interface is configured to interface the robotic device with at least one of a first battery pack of the plurality of different types of battery packs having a nominal voltage of 18 volts (V) and a battery capacity of between 3 ampere-hours (Ah) and 15 Ah, a second battery pack of the plurality of different types of battery packs having a nominal voltage of 12 V and a battery capacity of between 1.5 Ah and 15 Ah, a third battery pack of the plurality of different types of battery packs having a nominal voltage of between 70 V and 120 V and a battery capacity of between 3 Ah and 15 Ah, and a fourth battery pack of the plurality of different types of battery packs having a nominal voltage of between 70 V and 120 V and a battery capacity of between 3 Ah and 30 Ah;

a wireless communications module configured to receive a control signal from an external device, the wireless communication module and the external device configured to communicate wirelessly while within a communication range;

a controllable arm including one or more joints and a clamping device, the one or more joints configured to articulate the controllable arm, the clamping device configured to clamp an object; and a controller configured to:

receive the control signal from the wireless communications module, determine whether to articulate the controllable arm based on the control signal, and articulate the controllable arm to clamp the object in response to the control signal.

13. The robotic device of claim 12, wherein the wireless communications module includes a global positioning system, the wireless communications module further configured to:

store a set of location data of the global positioning system in a memory of the robotic device; and send the set of location data to the external device to track a location of the robotic device.

14. The robotic device of claim 12, wherein the robotic device is configured to follow a predetermined transport path based on a global positioning system location.

15. The robotic device of claim 12, wherein the wireless communications module is configured to communicate at least one of a status of the robotic device, an operation statistic, an identification, a location, a set of sensor data, a set of usage information, a set of maintenance data, a project, or a task to complete to the external device.

16. The robotic device of claim 12, further comprising at least one internal battery cell configured to charge the at least one battery pack for powering the robotic device.

* * * * *